(12) United States Patent
Brown

(10) Patent No.: US 7,310,063 B1
(45) Date of Patent: Dec. 18, 2007

(54) NAVIGATION SYSTEM FOR A SNORKELER

(76) Inventor: Richard Ivan Brown, 2335 Peachtree La., Northbrook, IL (US) 60062

( * ) Notice: Subject to any disclaimer, the term of this patent is extended or adjusted under 35 U.S.C. 154(b) by 0 days.

(21) Appl. No.: 11/433,229

(22) Filed: May 13, 2006

(51) Int. Cl.
*G01S 1/00* (2006.01)
(52) U.S. Cl. .................................. 342/357.06
(58) Field of Classification Search ............ 342/357.06
See application file for complete search history.

(56) References Cited

U.S. PATENT DOCUMENTS

| | | | | |
|---|---|---|---|---|
| 4,611,551 | A | * | 9/1986 | Ferguson et al. ............ 114/339 |
| 5,331,602 | A | | 7/1994 | McLaren |
| 5,406,294 | A | | 4/1995 | Silvey et al. |
| 5,798,733 | A | | 8/1998 | Ethridge |
| 6,269,763 | B1 | * | 8/2001 | Woodland .................... 114/382 |
| 6,318,363 | B1 | | 11/2001 | Monnich |
| 6,668,822 | B2 | | 12/2003 | Monnich |
| 6,701,252 | B2 | | 3/2004 | Brown |
| 6,791,490 | B2 | | 9/2004 | King |
| 6,856,578 | B2 | | 2/2005 | Magine et al. |
| 2004/0169917 | A1 | * | 9/2004 | Wantig et al. .............. 359/402 |
| 2004/0174009 | A1 | * | 9/2004 | Mark ........................ 281/15.1 |

OTHER PUBLICATIONS

Snorkel, The American Heritage Dictionary of the English Language: Fourth Edition, 2000.*

* cited by examiner

*Primary Examiner*—Thomas H. Tarcza
*Assistant Examiner*—Fred H. Mull

(57) ABSTRACT

A navigation system is provided for use by a snorkeler. A GPS signal receiving antenna (31) is coupled to the snorkeler in a substantially fixed spatial relationship and communicates with a display (41) to provide the snorkeler with navigational information. In the illustrative embodiment, the GPS signal receiving antenna (31) is attached to the breathing tube (23) of the diver's snorkel (20) and communicates with the display (41) of a handheld GPS receiver (40) housed in a waterproof case (50). The GPS signals received by the GPS signal receiving antenna (31) are conveyed to the handheld GPS receiver (40) via a GPS re-transmitting antenna (35) housed in the same waterproof case (50). An externally operable pushbutton (56) allows the snorkeler to switch between multiple screens presented on the display (41) to guide him through the snorkeling site.

20 Claims, 1 Drawing Sheet

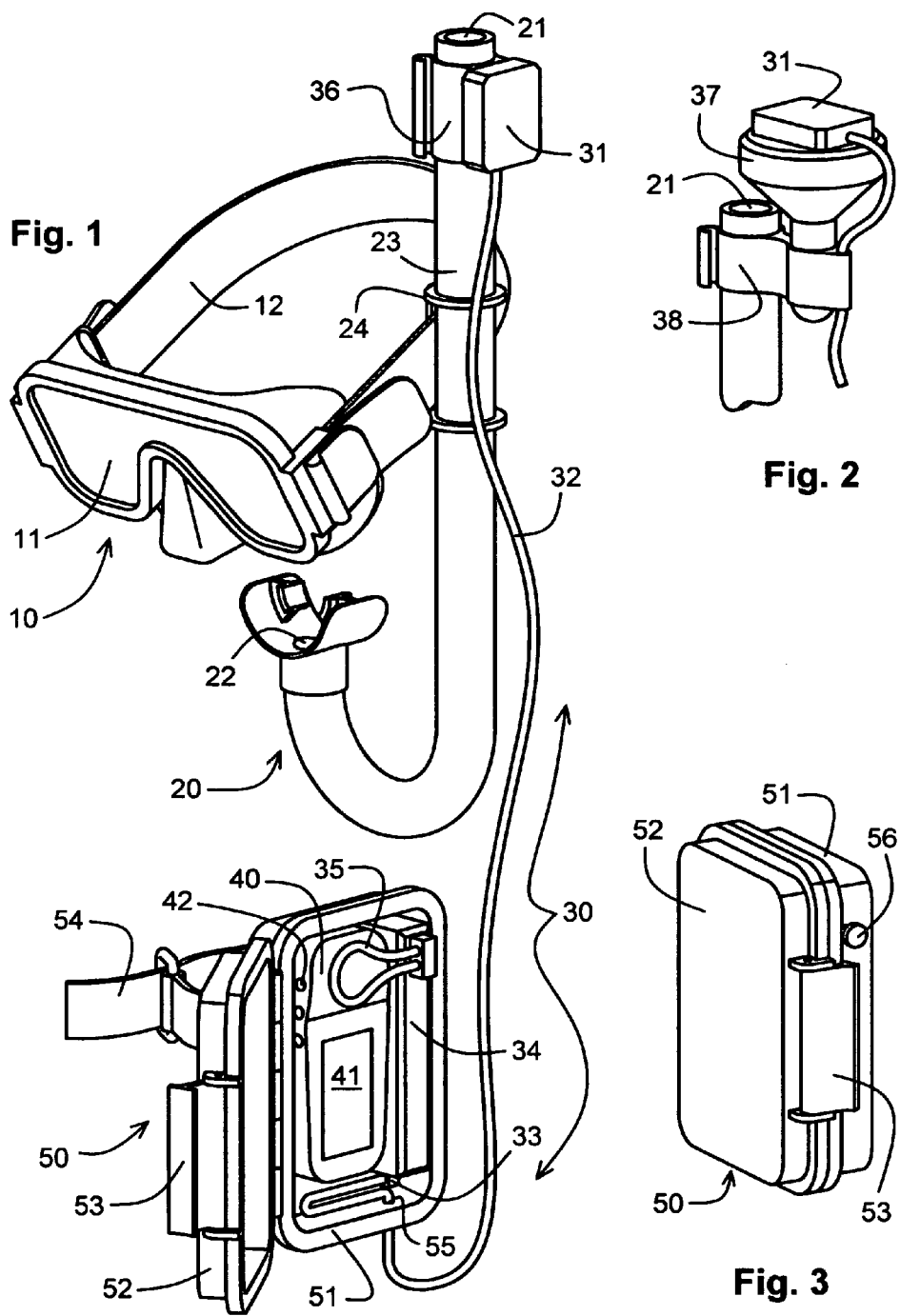

NAVIGATION SYSTEM FOR A SNORKELER

FIELD OF THE INVENTION

The invention relates to the field of navigation, and, more specifically, to a global positioning system (GPS) based navigation system for snorkelers.

BACKGROUND OF THE INVENTION

The present invention provides a GPS based navigation system for use by a swimmer while snorkeling. One would not expect that a snorkeler would need a sophisticated navigation system since all he has to do is raise his head and look around to acquire whatever visual points of reference he might need to find his way around a snorkeling site. Surprisingly, however, providing the snorkeler with a navigation system greatly increases his safety and enjoyment, can have a positive effect on the environment, and can improve the health of the coral reef system as discussed below.

Snorkeling has become increasingly popular among tourists at resorts and parks, and as side excursions on cruises. Most tourists have limited or no snorkeling experience. After donning mask, snorkel and fins, they swim off with only a general idea of where the most interesting sites are. With luck, they might happen upon a good area, but are much more likely to miss most of them entirely. Even with fairly good directions they may still miss their destination due to less than ideal visibility, poor navigation skills, or both.

To solve this problem, a few sites, like the Buck Island Reef National Monument off St. Croix in the US Virgin Islands, have marked underwater trails for snorkelers to follow. However, marking an underwater trail is expensive and difficult to do without taking away the natural beauty of the site. Additional expense and complication arise when maintenance issues develop. And placing permanent markers on a coral reef raises significant environmental issues.

Another problem can arise when a snorkeler ventures into a shallow area where an environmental fragile entity exists, such as a coral bed or delicate sea anemone. In such tight quarters it is easy to contact the entity, causing damage to it and, perhaps, to the snorkeler.

Yet another problem a snorkeler might encounter is that of finding his way back to a given starting point or to some other predetermined exit point. Beaches and coves look remarkably different when viewed from the water rather than from the land. The problem is compounded if the weather suddenly turns inclement. Even if the weather remains mild, waves can obscure details of the shoreline, again making it difficult to find the correct exit point. Even snorkelers who swim from excursion boats can't completely avoid the problem because there are frequently many excursion boats all looking approximately alike at the same site.

Still another problem that a resort snorkeler encounters is that of time management. It is not unusual that he only have so much time to devote to his outing. He may in fact have to meet a tour bus at a particular time or return his rented equipment before the rental shop closes. It is difficult enough to meet that kind of time commitment even if he knows what time it is, yet many resort snorkelers don't have watches that can be used underwater.

Thus snorkelers, and especially inexperienced snorkelers, face a number of issues they aren't aware of when the they start. They may not know where they are, where they're going, or how they're going to find the right exit point at the right time. They may stumble into areas that are environmentally fragile or unsafe to swim into. All of these problems become even more daunting if inclement weather suddenly arises, even for experienced snorkelers. And so there exists an unmet need for a navigation system suitable for use by snorkelers.

Navigation systems based on GPS are capable of providing a user with a wide array of information. Even low priced handheld GPS receivers can present latitude and longitude, display a user's position on a graphical map, report speed and heading, compute distance and bearing to preset points, follow predetermined routes or previously stored tracks, estimate time of arrival, and any number of other navigational statistics. A handheld GPS receiver would be ideal for use by a snorkeler if it weren't for the fact the electromagnetic GPS signals cannot penetrate more than a few centimeters into water.

And yet, GPS has been adapted for use underwater. One system that could be used by snorkelers to navigate while swimming is disclosed in U.S. Pat. No. 6,701,252 issued to this applicant, the disclosure of which is incorporated herein by reference. In that system, a GPS signal receiving antenna is located on a float supporting a diver-down flag and connected by wire to a GPS display carried by a scuba diver. By necessity, this system requires that the scuba diver tow the float behind him, but this is not an issue for scuba divers since they frequently have to tow a diver-down flag anyway. But towing a float is an encumbrance for a snorkeler, especially an inexperienced one, because the towline is distracting, occupies one hand, presents a constant drag, and frequently becomes entangled in his arms, legs, and fins.

Still another issue with the above system that makes it less desirable for use by a snorkeler is that the navigational information computed by the system is that for the float, not the scuba diver. In particular, the location and direction of travel of the float is not necessarily that of the scuba diver because the float is at the end of a long towline and is thus slow to respond to a change in direction by the scuba diver. As a result, the scuba diver relies on his own compass for determining his heading instead of the heading reported by the GPS. But a snorkeler does not ordinarily wear a compass and would thus need to keep correcting his direction of motion to compensate for the lag induced by towing a float.

And so there is clearly a need for a navigation system that can be used by a snorkeler not currently met by the state of the art.

SUMMARY OF THE INVENTION

It is therefore an object of the present invention to provide a navigation system suitable for use underwater by a snorkeler.

It is a further object of the present invention to provide a snorkeler with means to determine his present location.

It is yet another object of the present invention to provide a snorkeler with means to navigate his way to a desired point.

It is a further object of the present invention to provide a snorkeler with means to avoid wandering into ecologically fragile or personally hazardous areas.

It is still another object of the present invention to provide a snorkeler with means to navigate a predetermined course.

It is yet another object of the present invention to provide means and method by which an underwater trail can be established without placing markers or the like that would distract from the site or create environmental issues.

It is a further object of the present invention to provide a snorkeler with a navigation system that is not an encumbrance to his motion.

It is yet another object of the present invention to provide a navigation system that accurately reports a snorkeler's instantaneous direction of motion.

It is still another object of the present invention to provide a snorkeler with means to manage his activities in a timely manner.

It is yet another object of the present invention to provide a snorkeler with a navigation system that is affordable and easy to use.

It is still another object of the present invention to provide a navigation system suitable for use by a snorkeler that is easily manufactured.

It is a further object of the present invention to provide a navigation system suitable for use underwater that can be lent or rented to a snorkeler to conduct a self-guided snorkeling tour.

The present invention accomplishes its objectives by using a GPS based navigational approach. A system is provided that separates the GPS signal receiving antenna from a display screen adapted to present navigational information to the snorkeler. The GPS receiving antenna is located above the water, preferably on the diver's snorkel, while the display screen can be viewed by the snorkeler while underwater.

The illustrative embodiment consists of a snorkel, a handheld GPS receiver, a GPS signal receiving antenna, a GPS signal re-transmitter, and a waterproof case; all of which are known in the art and commercially available. The re-transmitter receives an amplified signal from the GPS receiving antenna and re-transmits the GPS signal to the handheld GPS receiver. The handheld GPS receiver, the re-transmitter, and the GPS signal re-transmitting antenna are housed in the waterproof case and are in communication with the external GPS signal receiving antenna through a wire penetrating the waterproof case.

The present invention thus provides the snorkeler with a system that can provide needed navigational information that includes, but is not limited to, distance and direction to a predetermined location; current location and velocity; and/or graphical representation of the snorkeler's position on a map.

Numerous other advantages and features of the present invention will become readily apparent from the following detailed description of the invention and the embodiments thereof, from the claims and from the accompanying drawing figures in which the details of the invention are fully and completely disclosed as a part of this specification.

BRIEF DESCRIPTION OF THE DRAWINGS

FIG. 1 is a perspective view of an illustrative embodiment of the present invention showing a GPS signal receiving antenna mounted on a snorkel and in communication with a waterproof case containing a GPS re-transmitter and a handheld GPS receiver.

FIG. 2 is a perspective view of an alternate form of the antenna mount of the GPS signal receiving antenna of the illustrative embodiment of FIG. 1.

FIG. 3 is perspective view of the waterproof case of FIG. 1 shown in the closed position and illustrating a pushbutton suitable for use in the illustrative embodiment.

DETAILED DESCRIPTION OF THE ILLUSTRATIVE EMBODIMENT

The illustrative embodiment is shown in FIG. 1 and comprises mask 10, snorkel 20, GPS re-radiator assembly 30, handheld GPS receiver 40, and waterproof case 50. Masks and snorkels are known in the art and shown in only generic form. GPS re-radiator assemblies are also known in the art and typically comprise a receiving antenna, a power source, a signal amplifier and a re-transmitting antenna. Handheld GPS receivers are also known in the art and are marketed by a number of manufactures. Typically, they include an internal GPS signal receiving antenna, a GPS signal and data processor, and a display for presenting navigational information to the user. The type and form of the navigational information presented varies from manufacturer to manufacturer, but most have several user selectable screens to present a graphical map, a compass, and numerical data. They have become so ubiquitous that a detailed explanation of their workings, controls, and graphical displays is not necessary herein to appreciate the nature and scope of the present invention. General details of their operation are introduced in the follow description as the need arises.

The Illustrative Apparatus. Mask 10 having substantially transparent face plate 11 and strap 12 allows the snorkeler to see while underwater. Snorkel 20 having air intake opening 21 and mouthgrip opening 22 at either ends of breathing tube 23 allows the snorkeler to breath while still being able to view the underwater terrain. Snorkel retainer 24 can be used to couple snorkel 20 to mask 10 to keep air intake opening 21 above water while the snorkeler is swimming face down on the surface.

GPS re-radiator assembly 30 comprises GPS signal receiving antenna 31, wire 32, connector 33, GPS re-radiator case 34, and GPS signal re-transmitting antenna 35. GPS signal receiving antenna 31 amplifies a received GPS signal and conveys that amplified signal to GPS re-radiator case 34 for re-transmission by GPS re-transmitting antenna 35. GPS re-radiator case 34 includes a battery, an on/off switch, and a circuit card that includes inductors and capacitors (none shown). The battery powers the amplifier of GPS signal receiving antenna 31 while the inductors and capacitors allow simultaneous power and signal conduction through coaxial wire 32. GPS signal re-transmitting antenna 35 is positioned over the internal GPS antenna of handheld GPS receiver 40. Handheld GPS receiver 40 includes display 41 to present GPS information to the user.

GPS re-radiating case 34, GPS signal re-transmitting antenna 35 and handheld GPS receiver 40 are housed in waterproof case 50 having base 51, lid 52 and latch 53. Lid 52 is at least partially transparent to provide the snorkeler with a view of display 41. Waterproof case 50 further includes wrist strap 54 so that the snorkeler need not carry waterproof case 50 in his hand, although other means of tethering waterproof case 50 to the snorkeler can be used. Waterproof case 50 further includes hole 55 through which connector 33 and wire 32 pass prior to being sealed by known methods.

GPS signal receiving antenna 31 is mounted to clip 36 adapted to attach GPS signal receiving antenna 31 to snorkel 20, preferably on breathing tube 23. Alternatively GPS signal receiving antenna 31 can be mounted on adapter 37 as shown in FIG. 2. Adapter 37 further includes clip 38 to permit attachment to snorkel 20. Clips 36 and 38 can be manufactured such that they permanently or, preferably, detachably attach GPS signal receiving antenna to snorkel 20. Further, as shown in FIGS. 1 and 2, GPS signal receiving antenna 31 can be positioned above, at, or below the level of air intake opening 21.

Handheld GPS receiver 40 has several user operable pushbuttons 42. The specific handheld GPS receiver 40 used in the illustrative embodiment has three on the left side and two more on the right (not visible). Any or all of pushbuttons 42 are herein referred to simply as pushbutton 42 or pushbuttons 42. On dry land, a user can operate pushbuttons 42 to perform various functions or select different graphical presentations.

FIG. 3 depicts base 51 and lid 52 of waterproof case 50 in the closed position, locked in place by latch 53. Waterproof case 50 further includes externally operable watertight pushbutton 56 to allow the operation of one of the left side pushbuttons 42 of handheld GPS receiver 40. Watertight pushbutton 56 of the illustrative embodiment is locate towards the top of base 51 to accommodate the eTrex® line of handheld GPS receivers marketed by Garmin International. Watertight pushbutton 56 could just as well have been located on the front of lid 52 to accommodate the Magellan® eXplorist™ line of handheld GPS receivers. Waterproof case 50 could include any number of watertight pushbuttons 56 to operate additional pushbuttons 42 on handheld GPS receiver 40, if so desired. The system, as a whole, will have greater flexibility by increasing the number of operable watertight pushbuttons 56, but at the expense of increased complexity for the snorkeler. As will be shown below, a system without externally operable actuating devices can be used effectively to navigate a snorkeling site, but the addition of just a one greatly increases the utility of the system without rendering the system too complicated for a first time user.

Methods Of Use. There are a number of ways in which the navigation system of the present invention can be used. In its simplest form of operation, handheld GPS receiver 40 and GPS re-radiator case 34 are powered on and handheld GPS receiver 40 set to display a graphical map of the snorkeling site prior to closing waterproof case 50. After acquiring a navigation fix, the snorkeler can then navigates the site by simply referring to his position as presented on the graphical map. He can avoid wandering into areas where the water is shallow and, thus, minimize the risk of injury to himself or the ecology due to inadvertent contact with environmentally fragile entities. He can also avoid hazardous areas like rip currents or potentially dangerous shore breaks if they have been previously marked on the map. When he wishes to return to his starting point, he need only refer to the graphical map to determine the best route back. Alternatively, he could have stored his starting location as a waypoint and set handheld GPS receiver 40 to display the distance and direction back to that point.

If site specific routes or tracks had been previously stored or loaded into handheld GPS receiver 40, the snorkeler could select one and then follow it along as it is displayed on the graphical map. Using the system in this manner is analogous to following a permanently marked trail except the snorkeler is free to digress from the trail without fear of being unable to reacquire the trail at a later time. A resort or park could establish any number of interesting snorkeling trails without having to disturb the site with environmentally damaging markers. They could then lend or rent the navigation system of the present invention to interested snorkelers.

The specific handheld GPS receiver 40 used in the illustrative embodiment is an eTrex® Legend-C and can display up to five user selectable numeric data fields overlaid on a graphical map screen. Data that can be displayed in these fields includes bearing, course, distance to destination, distance off course, distance traveled, estimated time of arrival, heading, latitude, longitude, speed, sunset, time to destination, and time of day along with numerous variations on the same. Many of these statistics can be useful to the snorkeler but displaying them significantly reduces how much of the graphical map can be seen.

Like many other handheld GPS receivers, the eTrex® Legend C has a number of additional graphic screens selectable through the operation of one of a pushbuttons 42, allowing the user to switch from a graphical map screen to a compass screen to a numerical screen and back again. Watertight pushbutton 56 is positioned to interact with the specific pushbutton 42 on the eTrex® Legend C that allows the user to select which graphical screen he wishes to view. The snorkeler need only operate watertight pushbutton 56 to switch through the available screens.

The external operable actuating device of the illustrative embodiment is a watertight pushbutton, but pushbuttons are just one form of actuating device that could be used in the present invention. Numerous external operable activating devices are known in the art, all of which are contemplated for use herein, whether manually operated or otherwise Manufacturing Considerations. The system of the present invention can be manufactured in many ways. The system depicted in the illustrative embodiment is that which a small manufacturer might choose because it can be fabricated from commercially available components and thus requires no significant capital investment. Handheld GPS receiver 40 is an eTrex® Legend-C marketed by Garmin International of Olathe, Kans. and requires no modification. The eTrex® Legend-C was chosen because of its small size, ease of operation, low cost, and its ability to accept highly detailed nautical charts suitable for navigating snorkeling sites.

GPS re-radiator assembly 30 is a modification of the GART3X Portable Re-radiating Antenna Set STR-3 MCX marketed by Pc-Mobile of Hong Kong. The set has been modified to make GPS re-radiating case 34 smaller by repackaging the circuit board into a smaller case and replacing the three AAA batteries with a single 4.5 volt photobattery. In addition, GPS signal transmitting antenna 35 has been shortened and rigidly mounted to GPS re-radiator case 34.

Waterproof case 50 is a modified #1010 Micro Case marketed by Pelican® Products of Torrence, Calif. The case has been modified by adding wrist strap 54 and drilling and sealing hole 55 after connector 33 and a portion of cable 32 is passed therethrough. Alternatively, a waterproof connector could have been used. The case is further modified by drilling an additional hole in base 51 to accept a spring loaded pin to act as watertight pushbutton 56. The pin passes through GPS re-radiator case 34 to contact the appropriate pushbutton 42 on eTrex™. A flexible watertight cap is bonded to base 51 and over the pin to keep the system watertight.

The selection of components for use in the system is clearly a matter of choose. Other parts and components could just as well have been used. For instance, waterproof case 50 could be replaced by any one of a number of commercially available waterproof flexible see-through bags. Other manufacture's handheld GPS receivers, re-radiators, and waterproof cases could be equally well employed.

With a modest capital investment, waterproof case 50 could be manufactured to incorporate a GPS re-radiator, waterproof connector, and any number of externally operable actuating devices. With an even greater capital investment, handheld GPS receiver 40 could be redesigned to be inherently waterproof for depths greater than their current three foot limit and could include a waterproof connector to accept a GPS signal receiving antenna, thereby eliminating the need for separate waterproof cases, GPS re-radiators or re-radiating antennas.

All of the manufacturing methods described above can produce a navigation system suitable for use by a snorkeler that is economically priced.

Variations And Enhancements As demonstrated above, there is great flexibility as to how the system of the present invention can be configured, fabricated and used. However, the flexibility of the system is not limited to just those variations discussed above. Moreover, there are also several enhancements to the system or systems described above.

GPS signal receiving antenna 31 has been shown attached or coupled to snorkel 20, but this is a preference, not a requirement. When mounted at or near the top of snorkel 20, GPS signal receiving antenna 31 is in a fixed position relative to the snorkeler and is located at the highest point above the water, thus having the least often wave swamped view of the sky. However, any coupling method that anchors GPS signal receiving antenna 31 to the snorkeler in a substantially fixed spatial relationship would work so long as it allowed the system to acquire a navigational fix often enough to be useful for navigational purposes and remained sufficiently close to the snorkeler so as to appear to move in a manner reflective of the snorkeler's movement. There are several alternative locations to mount the antenna.

GPS signal receiving antenna 31 can be attached to strap 12 of mask 10. If so located, GPS signal receiving antenna 31 will be covered over by water more frequently than if it were mounted on snorkel 21, but can still receive GPS signals often enough to provide some degree of navigational tracking. Or alternatively, GPS signal receiving antenna 31 can be mounted on a harness or collar worn by the snorkeler independent of the mask or snorkel so long as GPS signal receiving antenna 31 is presented with a clear view of the sky often enough to acquire a navigational fix. GPS signal receiving antenna 31 can also be mounted on a float tethered to the snorkeler a distance of no more than three meters from his head so that any lag in the motion of GPS signal receiving antenna 31 relative to the motion of the snorkeler appears virtually negligible.

The system of the illustrative embodiment transmits an amplified GPS signal through wire 32. However, this is not a limitation of the system either since GPS signal receiving antenna 31 can also include signal processing circuitry to convert the GPS signals to navigational information transmissible in the form of NEMA 0183 sentences, or the like. One GPS signal receiving antenna 31 capable of doing such is the GPS 18 Sensor also marketed by Garmin International. Handheld GPS receiver 40, GPS re-radiator case 34 and GPS signal re-transmitting antenna 35 are replaced by a device adapted to process the NEMA 0183 sentences into displayable navigation data, such as a handheld PDA. A system of this design is analogous to that disclosed in U.S. Pat. No. 6,701,252 cited above except that GPS signal receiving antenna 31 is supported by the snorkeler as opposed to attached to a float carrying a diver-down flag.

In yet another variation on the system of the illustrative embodiment, wire 32 can be eliminated if GPS signal receiving antenna 31 includes means to wirelessly transmit data to a graphical display device. As an example of such a system, the GPS 18 Sensor discussed above can be interfaced with a light emitting diode to optically transmit NEMA 0183 sentences to a waterproofed PDA for processing and presentation to the snorkeler. Ultrasonics and, if close enough, radio frequency transmission could also be used to establish wireless data transmission.

The system could be further enhanced and made more enjoyable and informative for the snorkeler by adding additional screens to those already available on most handheld GPS receivers. These screens can include information describing particularly interesting features of specific locations along any given underwater trail such as unusual terrain, caverns, or details of a wreck etc. and could be made to automatically appear when the snorkeler is within some predetermined distance of the location. Additional screens could be provided to illustrate the different types of fish, coral, and vegetation native to the area as a whole to help the snorkeler identify the various things he might see.

The system has been heretofore described as for use by snorkelers, but scuba divers will also find it useful. It is not unusual for a scuba diver to snorkel out to a particular dive site before submerging. The systems disclosed herein allow the scuba diver to swim directly to his intended site. Unfortunately, the system would no longer provide the scuba diver with navigation information after he submerged because the GPS signal receiving antenna would no longer have a clear view of the sky. However, once he re-surfaced, the system would again provide navigational information and he could find his way back to his starting point or some other pre-established waypoint. This is an important safety feature of the system for both snorkelers and scuba divers because heavy fog can sometimes develop without warning, leaving the diver dangerously disoriented if his exit point is a small boat far from shore or a small beach or narrow cove hidden along a rugged coastline.

Thus has been presented a novel concept for a low cost navigation system suitable for use by a snorkeler. The system provides the snorkeler with means to navigate his way about any particular snorkeling site without fear of becoming lost. It is easy and enjoyable to operate, even for first time users with little or no experience. It lends itself well to any number of manufacturing techniques and can accommodate numerous variations and enhancements. It provides a means by which resort operators and park managers can establish underwater trails at virtually no cost and without compromising the environment while providing the resort or park with the opportunity to bring in added revenues. It can help maintain the health of the reef system and provides a degree of safety heretofore unavailable to snorkelers.

From the foregoing, it has been shown that numerous additional variations and modifications may be effected without departing from the true spirit and scope of the novel concept of the invention. It is to be understood that no limitation with respect to the specific apparatus, systems, or methods illustrated herein is intended or should be inferred. It is, of course, intended to cover by the appended claims all such modifications as fall within the scope of the claims.

I claim:

1. A navigation system for a snorkeler, comprising:
   (a) a waterproof enclosure, said enclosure at least partially transparent;
   (b) a display for presenting navigational information; said display housed in said waterproof enclosure and at least partially visible from outside said waterproof enclosure;
   (c) a snorkel comprising:
      (i) a breathing tube;
      (ii) a mouthgrip opening; and
      (iii) an antenna to receive GPS signals; and (d) means to position said antenna above the waterline when the head of said snorkeler is face down at the waterline.

2. The navigation system of claim 1 wherein said means includes a strap to at least partially encircle the head of said snorkeler and a retainer to couple said snorkel to said strap.

3. The navigation system of claim 1 further comprising coupling means to detachably attach said antenna to said breathing tube.

4. The navigation system of claim 3 wherein said coupling means includes a clip mounting said antenna.

5. The snorkel of claim 4 wherein said clip comprising an upstanding member including an antenna mount located above the top of said breathing tube.

6. The navigation system of claim 1 wherein said display is a part of a handheld GPS receiver.

7. The navigation system of claim 6 wherein said handheld GPS receiver includes at least one actuating device and said waterproof enclosure includes at least one actuating device to interact with said at least one actuating device of said handheld GPS receiver.

8. The navigation system of claim 1 wherein said waterproof enclosure is the housing of a handheld GPS receiver and said display is positioned behind an at least partially transparent window in said housing.

9. The navigation system of claim 1 further including a GPS signal re-transmitter.

10. The navigation system of claim 1 further comprising communication means to establish communication from said antenna to said display.

11. The navigation system of claim 10 wherein said communication means is selected from the group consisting of wire, optics, sound, and radio waves.

12. A navigation system for a snorkeler, comprising:
 (a) a waterproof enclosure, said enclosure at least partially transparent;
 (b) a display for presenting navigational information; said display housed in said waterproof enclosure and at least partially visible from outside said waterproof enclosure;
 (c) a strap to at least partially encircle the head of said snorkeler;
 (d) an antenna to receive GPS signals, said antenna outside said enclosure; and
 (e) means to couple said antenna to said strap and to position said antenna above the waterline when the head of said snorkeler is face down at the waterline.

13. The navigation system of claim 12 wherein said strap is a part of a mask to allow said snorkeler to see underwater.

14. The navigation system of claim 12 wherein said means comprises a snorkel including a strap retainer and said snorkel includes said antenna.

15. The navigation system of claim 14 further comprising coupling means to detachably attach said antenna to said snorkel.

16. A snorkel comprising:
 (a) a breathing tube; and
 (b) an antenna to receive GPS signals, said antenna detachably attachable to said breathing tube.

17. The snorkel of claim 16 wherein said antenna includes a clip and said clip renders said antenna detachably attachable to said breathing tube.

18. The snorkel of claim 17 wherein said clip comprises an upstanding member including an antenna mount located above the top of said breathing tube.

19. The snorkel of claim 16 further comprising communication means to establish communication from said antenna to a navigational display device.

20. The snorkel of claim 19 wherein said communication means is selected from the group consisting of wire, optics, sound, and radio waves.

* * * * *